US009508978B2

(12) United States Patent
Han et al.

(10) Patent No.: US 9,508,978 B2
(45) Date of Patent: Nov. 29, 2016

(54) RECHARGEABLE BATTERY MODULE

(71) Applicant: Samsung SDI Co., Ltd., Yongin-si, Gyeonggi-do (KR)

(72) Inventors: Min-Yeol Han, Yongin-si (KR); Seung-Bok Lee, Yongin-si (KR); Hyun-Gyu Park, Yongin-si (KR); Yong-Hee Yun, Yongin-si (KR); Hae-Kwon Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 50 days.

(21) Appl. No.: 14/198,511

(22) Filed: Mar. 5, 2014

(65) Prior Publication Data
US 2015/0064517 A1 Mar. 5, 2015

(30) Foreign Application Priority Data

Aug. 30, 2013 (KR) .......................... 10-2013-0104280

(51) Int. Cl.
*H01M 2/34* (2006.01)
*H01M 2/10* (2006.01)
*H01M 2/20* (2006.01)

(52) U.S. Cl.
CPC ........... *H01M 2/348* (2013.01); *H01M 2/1077* (2013.01); *H01M 2/206* (2013.01); *H01M 2200/101* (2013.01)

(58) Field of Classification Search
CPC .... H01M 2/34; H01M 2/348; H01M 2/1077; H01M 2/206; H01M 2200/101
See application file for complete search history.

(56) References Cited

U.S. PATENT DOCUMENTS

| 7,462,416 B2 | 12/2008 | Kim |
| 2010/0227205 A1* | 9/2010 | Byun ................. H01M 2/0237 429/61 |
| 2011/0039147 A1* | 2/2011 | Cheon et al. ................. 429/159 |

FOREIGN PATENT DOCUMENTS

| KR | 10-0591432 | 12/2005 |
| KR | 10-2011-0017778 | 2/2011 |
| KR | 10-2011-0087843 A | 8/2011 |

OTHER PUBLICATIONS

Korean Patent Abstract KR 10-2005-0113983, published Dec. 5, 2005 A corresponding to KR10-0591432, 2 pages.
KIPO Office Action dated Jul. 20, 2016, for corresponding Korean Patent Application No. 10-2013-0104280 (7 pages).

* cited by examiner

*Primary Examiner* — Jonathan G Leong
*Assistant Examiner* — Seenam Agbetiafan
(74) *Attorney, Agent, or Firm* — Lewis Roca Rothgerber Christie LLP (57) ABSTRACT

A rechargeable battery module includes a plurality of unit cells each including a rechargeable battery, a first electrode terminal, and a second electrode terminal; a bus bar coupling adjacent ones of the plurality of unit cells; a first module terminal coupled to the first electrode terminal of one of the plurality of unit cells at one side of the unit cells; a second module terminal coupled to the second electrode terminal of an other one of the plurality of unit cells at an opposite side of the unit cells; and a module short-circuit member coupled to the first module terminal or the second module terminal, separated from the other module terminal, and configured to contact the other module terminal according to temperature.

11 Claims, 10 Drawing Sheets

RECHARGEABLE BATTERY MODULE

CROSS-REFERENCE TO RELATED APPLICATION

This application claims priority to and the benefit of Korean Patent Application No. 10-2013-0104280 filed in the Korean Intellectual Property Office on Aug. 30, 2013, the entire contents of which are incorporated herein by reference.

BACKGROUND

1. Field

The described technology relates generally to a rechargeable battery module having improved safety by including an external short-circuit mechanism.

2. Description of the Related Art

A rechargeable battery is a battery that is designed to be repeatedly charged and discharged, unlike a primary battery. A low-capacity rechargeable battery may be used, for example, in small portable electronic devices such as a mobile phone, a notebook computer, and a camcorder, and a large-capacity rechargeable battery may be used, for example, as a power supply for driving a motor such as for a hybrid car.

The rechargeable battery that may be used in small electronic devices may be a single-cell battery, and the rechargeable battery that may be used as a motor-driving power source, etc. may be a battery module including a plurality of cells that are electrically connected. The rechargeable battery module including the plurality of cells may be formed by connecting electrode terminals through a bus bar.

The operation of the rechargeable battery module may be terminated by the operation of one of a plurality of cell fuses while the rechargeable battery is operating in a high current region. However, when a short-circuit occurs while the rechargeable battery is operating in a low current region, the cell fuses included in the unit cells of the rechargeable battery module may not operate (e.g., may not properly operate or may not be configured to operate), and heat may be generated inside the electrode assembly, such that combustion and an explosion may occur.

The above information disclosed in this Background section is only for enhancement of understanding of the background of the described technology and therefore it may contain information that does not form the prior art that is already known in this country to a person of ordinary skill in the art.

SUMMARY

An example embodiment of the described technology relates generally to a rechargeable battery module creating (e.g., realizing) a high-current external short-circuit due to heat generated while the rechargeable battery is operating in a low current region at which a cell fuse may not operate.

A rechargeable battery module according to an example embodiment includes a plurality of unit cells each including a rechargeable battery, a first electrode terminal, and a second electrode terminal; a bus bar coupling adjacent ones of the plurality of unit cells; a first module terminal coupled to the first electrode terminal of one of the plurality of unit cells at one side of the unit cells; a second module terminal coupled to the second electrode terminal of an other one of the plurality of unit cells at an opposite side of the unit cells; and a module short-circuit member coupled to the first module terminal or the second module terminal, separated from the other module terminal, and configured to contact the other module terminal according to a temperature.

The module short-circuit member may have a bimetal structure, may be coupled to the second module terminal, and may be separated from the first module terminal by a first gap.

The first module terminal may include a first final terminal of the first electrode terminals of the plurality of unit cells, and an end of a terminal extension may be coupled to the first final terminal and a portion of the terminal extension may be adjacent the second module terminal.

The second module terminal may include a second final terminal of the second electrode terminals of the plurality of unit cells, and the module short-circuit member may be coupled to the second final terminal, may be separated from either an upper side or a lower side of the terminal extension by a first gap, and may be configured to bend toward said either the upper side or the lower side of the terminal extension according to a temperature of the second final terminal.

The second module terminal may include a second final terminal of the second electrode terminals of the plurality of unit cells, and the module short-circuit member may be coupled to the second final terminal, may be separated from an other end of the terminal extension by a second gap, and may be configured to expand toward the other end of the terminal extension according to a temperature of the second final terminal.

The module short-circuit member may include a shape memory alloy.

The module short-circuit member may be coupled to at least one second electrode terminal of the plurality of unit cells, may be separated from either an upper side or a lower side of the terminal extension by a third gap, and may be configured to bend toward said either the upper side or the lower side of the terminal extension according to a temperature of the second electrode terminal.

According to an example embodiment, while operating at a lower current region at which a cell fuse may not operate (e.g., may not disconnect), a module short-circuit member (e.g., a bimetal member) may operate according to the heat generated in an electrode assembly and transmitted to a first or second electrode terminal such that a high-current external short-circuit is created (e.g., realized). Due to the external short-circuit, a plurality of cell fuses may operate (e.g., may operate to disconnect) such that the operation of the rechargeable battery module may be terminated.

DETAILED DESCRIPTION

The present invention will be described more fully hereinafter with reference to the accompanying drawings, in which example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It will be understood that when an element or layer is referred to as being "on" or "connected to" another element or layer, it may be directly on or connected to the other element or layer or intervening elements or layers may also be present. When an element is referred to as being "directly on" or "directly connected to" another element or layer, there are no intervening elements or layers present. As used herein, the term "and/or" includes any and all combinations of one or more of the associated listed items. Further, the use of "may" when describing embodiments of the present invention refers to "one or more embodiments of the present invention."

Figure 1:
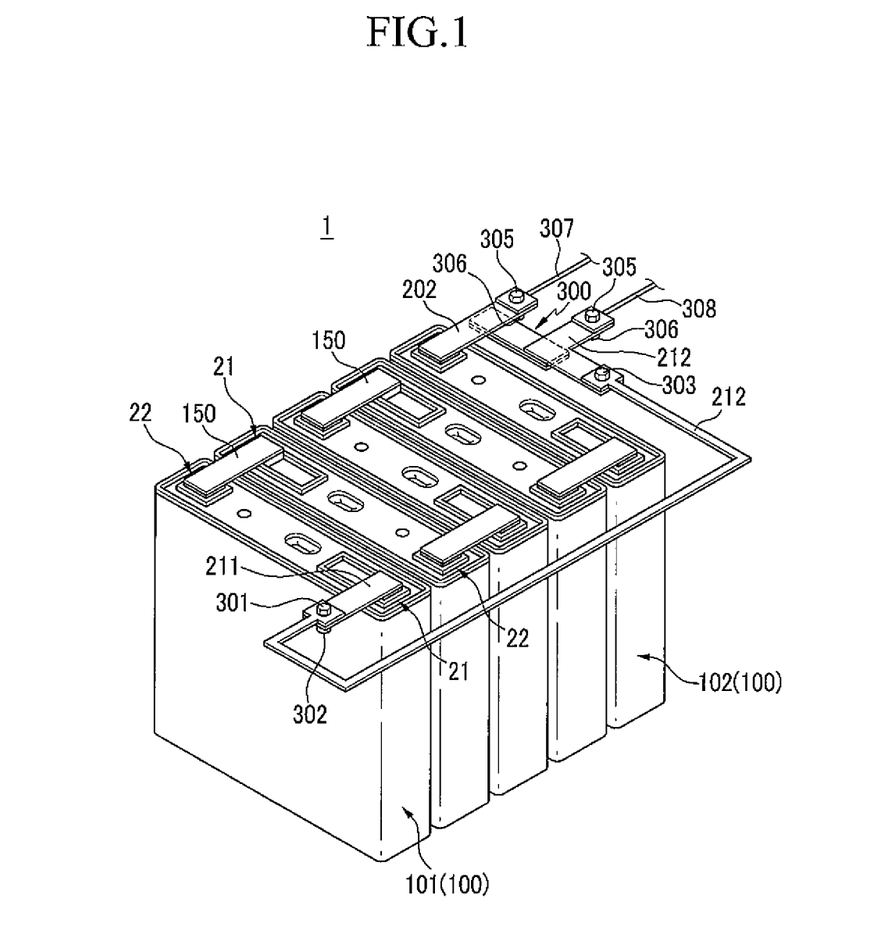
FIG. 1 is a perspective view of a rechargeable battery module according to a first example embodiment.

FIG. 1 is a perspective view of a rechargeable battery module according to a first example embodiment. Referring to FIG. 1, a rechargeable battery module 1 according to the first example embodiment includes unit cells 100 that include rechargeable batteries and a bus bar 150 coupling (e.g., electrically connecting or coupling) adjacent unit cells 100.

The bus bar 150 couples (e.g., electrically couples) a negative terminal (e.g., a first electrode terminal) 21 and a positive terminal (e.g., a second electrode terminal) 22 of the adjacent unit cells 100 in series. Alternatively, the bus bars may couple (e.g., electrically couple) the unit cells in parallel.

The rechargeable battery module 1 includes a first module terminal 201 coupled to the first electrode terminal 21 of an outermost unit cell (e.g., a left side unit cell 101) among the unit cells 100, a second module terminal 202 coupled to a second electrode terminal 22 of the other outermost unit cell (e.g., a right side unit cell 102), and a module short-circuit member 300.

The module short-circuit member 300 is coupled to one module terminal (for example, the second module terminal 202) among the first module terminal 201 and the second module terminal 202, and may be in contact or not contact with (e.g., may be connected to or disconnected from) the other module terminal (for example, the first module terminal 201).

That is, the module short-circuit member 300 may be separated from the first module terminal 201 by a first gap (G1, referring to FIG. 4), and when a reference temperature (e.g., a predetermined temperature) is reached, it may contact (e.g., be connected to or short-circuited to) the first module terminal 201. However, the module short-circuit member 300 and the first and second module terminals 201 and 202 may have various configurations.

In the first example embodiment, the first module terminal 201 includes a first final terminal 211 and a terminal extension 212 coupled to the left outermost unit cell 101 among the first electrode terminals 21 of the unit cells 100. The terminal extension 212 is coupled to the first final terminal 211 and extends to be adjacent (e.g., beside) the second module terminal 202. The terminal extension 212 may be fastened to the first final terminal 211 by a bolt 301 and a nut 302, thereby forming the first module terminal 201.

The second module terminal 202 includes a second final terminal coupled to the right outermost unit cell 102 among the second electrode terminals 22 of the unit cells 100. That is, the terminal extension 212 extends to be adjacent a side of the second final terminal.

One side of the module short-circuit member 300 is coupled to (e.g., fixedly coupled to) the second module terminal 202 and the other side thereof is separated from the terminal extension 212 by the first gap G1. The terminal extension 212 includes two plates being joined by a bolt 303 and a nut 304 (e.g., joined in a connection structure) (referring to FIG. 4). However, the extension member may be formed as one plate or one cable.

The module short-circuit member 300 may create (e.g., realize) an external short-circuit having a high current due to heat generated inside the unit cell 100 while the unit cell 100 operates at a lower current region at which cell fuses 511 and 521 (referring to FIG. 3) included in the unit cell 100 may not operate.

For example, the module short-circuit member 300 may have a bimetal structure and be coupled to one side of the second module terminal 202 and be separated from (e.g., separated from a side of) the terminal extension 212 of the first module terminal 201 by the first gap G1. Accordingly, the second module terminal 202 may be heated by the unit cell 100 (e.g., heated by the heat generated in the unit cell 100), and thereby the module short-circuit member 300 may contact (e.g., may be coupled to) the second module terminal 202.

Accordingly, in the rechargeable battery module 1, the external short-circuit is created (e.g., realized) and the current flows through the unit cells 100 due to the external short-circuit, and the cell fuses 511 and 521 may operate (e.g., may become disconnected) in the unit cells 100. That is, while the unit cells 100 operate in the lower current region at which the cell fuses 511 and 521 may not operate, the external short-circuit causing high-current flow may be caused (e.g., realized) by the operation of the module short-circuit member 300.

Figure 2:
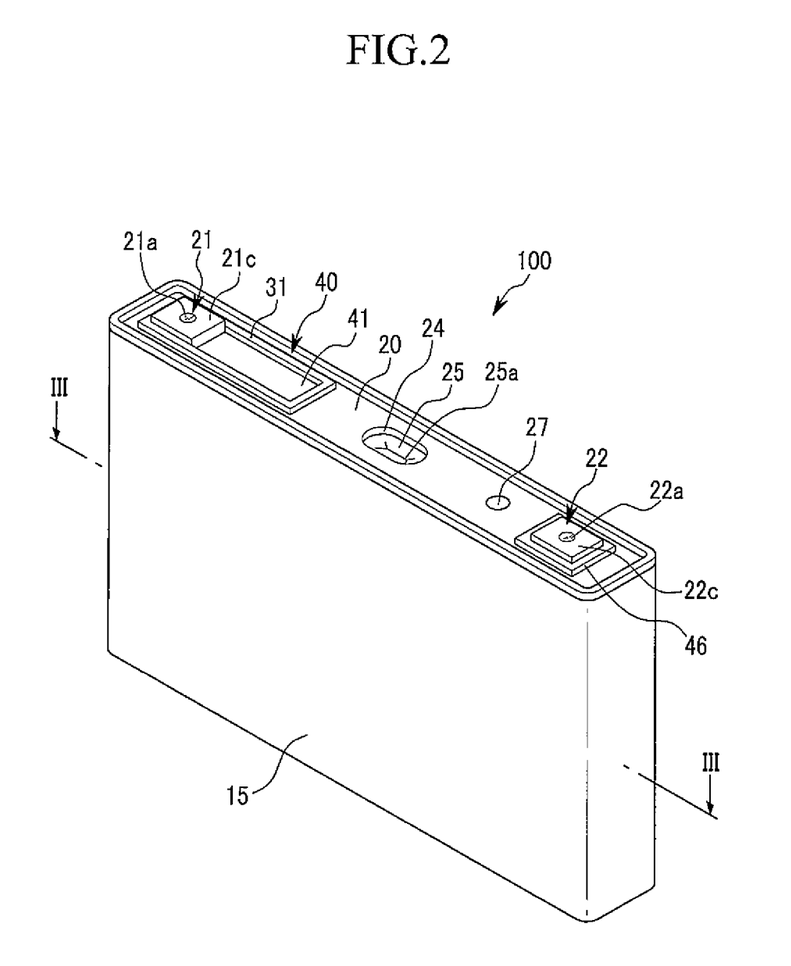
FIG. 2 is a perspective view of a unit cell illustrated in FIG. 1.
Figure 3:
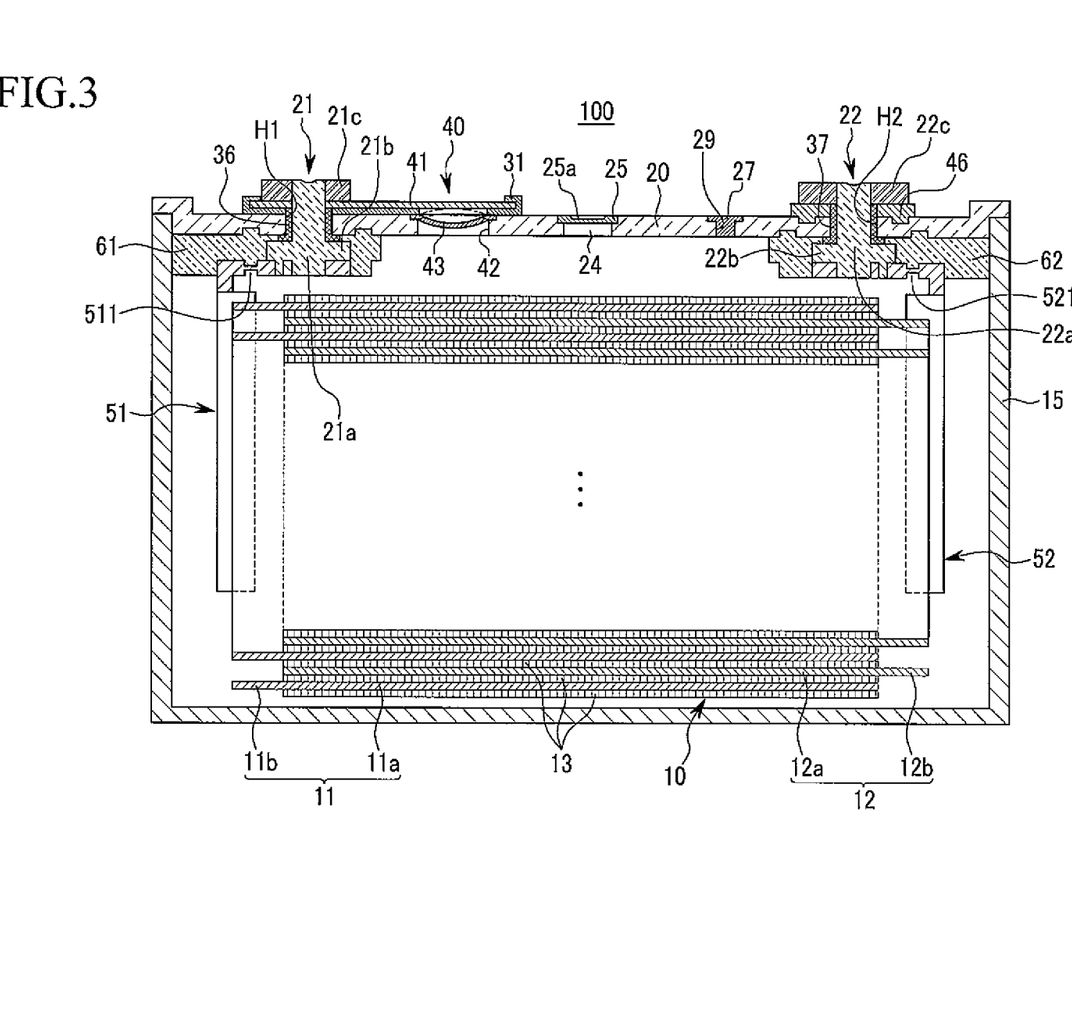
FIG. 3 is a cross-sectional view taken along the line Ill-Ill of FIG. 2.

FIG. 2 is a perspective view of a unit cell illustrated in FIG. 1, and FIG. 3 is a cross-sectional view taken along the line III-III of FIG. 2. Referring to FIG. 2 and FIG. 3, the unit cell 100 includes an electrode assembly 10 for charging and discharging an electric current, a case 15 receiving (e.g., configured to receive) the electrode assembly 10, a cap plate 20 coupled with an opening of the case 15, the first electrode terminal (hereinafter referred to as "negative terminal") 21 and the second electrode terminal (hereinafter referred to as "positive terminal") 22 installed in the cap plate 20, and an external short-circuit part 40 provided at the negative terminal 21 side.

For example, the electrode assembly 10 may be configured by disposing a negative electrode 11 and a positive electrode 12 at respective surfaces of a separator 13 being an insulator, and winding the negative electrode 11, the separator 13, and the positive electrode 12 in a jelly-roll configuration.

The negative electrode 11 and the positive electrode 12 include coated regions 11a and 12a where a current collector formed of a metal plate is coated with an active material, and uncoated regions 11b and 12b having an exposed current collector which is not coated with the active material, respectively.

The uncoated region 11b of the negative electrode 11 is formed at one end of the negative electrode 11 along the spirally wound negative electrode 11. The uncoated region 12b of the positive electrode 12 is formed at one end of the positive electrode 12 along the spirally wound positive electrode 12. The uncoated regions 11b and 12b are disposed at opposite ends of the electrode assembly 10.

For example, the case 15 is configured to have a substantially cubic shape to form a space for receiving the electrode assembly 10 and an electrolyte solution, and an opening connecting an inner space to the outside is formed on one surface of the cuboid. The opening enables the electrode assembly 10 to be inserted into the case 15.

The cap plate 20 is installed at the opening of the case 15 to close and seal the case 15. For example, the case 15 and the cap plate 20 are formed of aluminum so that the case 15 and the cap plate 20 may be welded to each other.

Further, the cap plate 20 includes an electrolyte injection opening 29, a vent hole 24, and terminal holes H1 and H2. After the cap plate 20 is coupled with the case 15, the electrolyte injection opening 29 may be used to inject the electrolyte solution into the case 15. After injecting the electrolyte solution, the electrolyte injection opening 29 is sealed by a sealing stopper 27.

The vent hole 24 is closed and sealed with a vent plate 25 so that internal pressure of the unit cell 100 may be contained. When the internal pressure of the unit cell 100 reaches a reference pressure (e.g., a predetermined pressure), the vent plate 25 is ruptured to open the vent hole 24 so that the internal pressure of the unit cell 100 may be discharged. The vent plate 25 includes a notch 25a for inducing (e.g., configured to induce) the rupture.

The negative terminal 21 and the positive terminal 22 are installed in the terminal holes H1 and H2 of the cap plate 20 and are electrically coupled to the electrode assembly 10. That is, the negative terminal 21 is electrically coupled to the negative electrode 11 of the electrode assembly 10, and the positive terminal 22 is electrically coupled to the positive electrode 12 of the electrode assembly 10. Accordingly, the electrode assembly 10 may be coupled outside the case 15 through the negative terminal 21 and the positive terminal 22.

Because the negative terminal 21 and the positive terminal 22 have the same structure at an inner side of the cap plate 20, a repetitive description thereof will be omitted. Because the negative terminal 21 and the positive terminal 22 have different structures at an outer side of the cap plate 20, the different structures will be separately described.

The negative and positive terminals 21 and 22 include rivet terminals 21a and 22a installed in the terminal holes H1 and H2 of the cap plate 20, respectively, flanges 21b and 22b integrally and widely formed in the rivet terminals 21a and 22a at an inner side of the cap plate 20, respectively, and plate terminals 21c and 22c coupled to the rivet terminals 21a and 22a, respectively, which are disposed at the outer side of the cap plate 20 through riveting or welding.

Negative and positive gaskets 36 and 37 are installed between the rivet terminals 21a and 22a of the negative and positive terminals 21 and 22 and inner surfaces of the terminal holes H1 and H2 of the cap plate 20, respectively, and they seal a space between the rivet terminals 21a and 22a of the negative and positive terminals 21 and 22 and the cap plate 20 and electrically insulate the rivet terminals 21a and 22a of the negative and positive terminals 21 and 22 from the cap plate 20.

The negative and positive gaskets 36 and 37 extend between the flanges 21b and 22b and an inner surface of the cap plate 20, and they further seal the space between the flanges 21b and 22b and the cap plate 20, and electrically insulate the flange 21b and 22b from the cap plate 20. That is, the negative and positive gaskets 36 and 37 prevent the electrolyte solution from leaking through the terminal holes H1 and H2 when installing the negative and positive terminals 21 and 22 in the cap plate 20.

Negative and positive electrode lead tabs 51 and 52 electrically couple the negative and positive terminals 21 and 22 to the negative and positive electrodes 11 and 12 of the electrode assembly 10, respectively. That is, by coupling the lead tabs 51 and 52 to a lower end portion of the rivet terminals 21a and 22a and by sealing (e.g., caulking) the lower end portion, the lead tabs 51 and 52 are coupled to the lower end portion of the rivet terminals 21a and 22a while being supported by the flanges 21b and 22b.

Also, the negative and positive electrode lead tabs 51 and 52 include the fuses 511 and 521. The fuses 511 and 521 may block (e.g., selectively block) the current between the negative and positive terminals 21 and 22 and the electrode assembly 10. As shown, the fuses 511 and 521 may be formed at the negative electrode 11 side and the positive electrode 12 side of the electrode assembly 10. However, they may be selectively formed at either the negative electrode 11 side or the positive electrode 12 side.

Negative and positive insulating members 61 and 62 are installed between the negative and positive electrode lead tabs 51 and 52 and the cap plate 20 to electrically insulate the negative and positive electrode lead tabs 51 and 52 from the cap plate 20. Further, one side of each of the negative and positive insulation members 61 and 62 is coupled with the cap plate 20, and the other side thereof surrounds the negative and positive electrode lead tabs 51 and 52, the rivet terminals 21a and 22a, and the flanges 21b and 22b, respectively, so that the structure (e.g., connection structure) thereof is stabilized.

Meanwhile, the external short-circuit part 40 will be described in connection with the plate terminal 21c of the negative terminal 21, and a top plate 46 will be described in connection with the plate terminal 22c of the positive electrode terminal 22.

The external short-circuit part 40 of the negative terminal 21 side includes a short-circuit tab 41 and a short-circuit member 43 which are spaced (e.g., spaced apart) or in contact (e.g., shorted) according to an internal pressure (e.g., a predetermined internal pressure) of the case 15. The short-circuit tab 41 is electrically coupled to the rivet terminal 21a of the negative terminal 21 and is disposed at an outer side of the cap plate 20 with an insulation member 31 interposed therebetween.

The insulation member 31 is installed between the short-circuit tab 41 and the cap plate 20 to electrically insulate the short-circuit tab 41 from the cap plate 20. That is, the cap plate 20 maintains a state of electrical insulation from the negative terminal 21.

The short-circuit tab 41 and the plate terminal 21c are coupled to the upper end of the rivet terminal 21a, and the upper end is sealed (e.g., caulked) such that the short-circuit tab 41 and the plate terminal 21a are coupled to the upper end of the rivet 20" terminal 21a. Accordingly, the short-circuit tab 41 and the plate terminal 21c are fixed to the cap plate 20 while interposing the insulation member 31 therebetween.

The short-circuit member 43 is installed in a short-circuit hole 42 which is formed in the cap plate 20. The short-circuit tab 41 is coupled to the negative terminal 21 and extends along an outer side of the short-circuit member 43. Accordingly, the short-circuit tab 41 and the short-circuit member 43 correspond to the short-circuit hole 42 and face each other to maintain a spaced state (illustrated by the solid line state in FIG. 3). When internal pressure of the unit cell 100 is increased, a short-circuit state (illustrated by the imaginary line state in FIG. 3) may be formed by inversion of the short-circuit member 43.

The top plate 46 of the positive terminal 22 side electrically couples the plate terminal 22c of the positive terminal 22 to the cap plate 20. For example, the top plate 46 is interposed between the plate terminal 22c and the cap plate 20 and is formed through the rivet terminal 22a.

Accordingly, the top plate 46 and the plate terminal 22c are coupled with an upper end of the rivet terminal 22a to seal (e.g., caulk) the upper end of the rivet terminal 22a, so that the top plate 26 and the plate terminal 22c are coupled with an upper end of the rivet terminal 22a. The plate terminal 22c is installed at an outer side the cap plate 20 while interposing the top plate 46 therebetween.

Meanwhile, the positive gasket 37 further extends between the rivet terminal 22a and the plate 46. The positive gasket 37 prevents the rivet terminal 22a from being electrically coupled (e.g., directly electrically coupled) to the top plate 46. That is, the rivet terminal 22a is electrically coupled to the top plate 46 through the plate terminal 22c.

Figure 4:
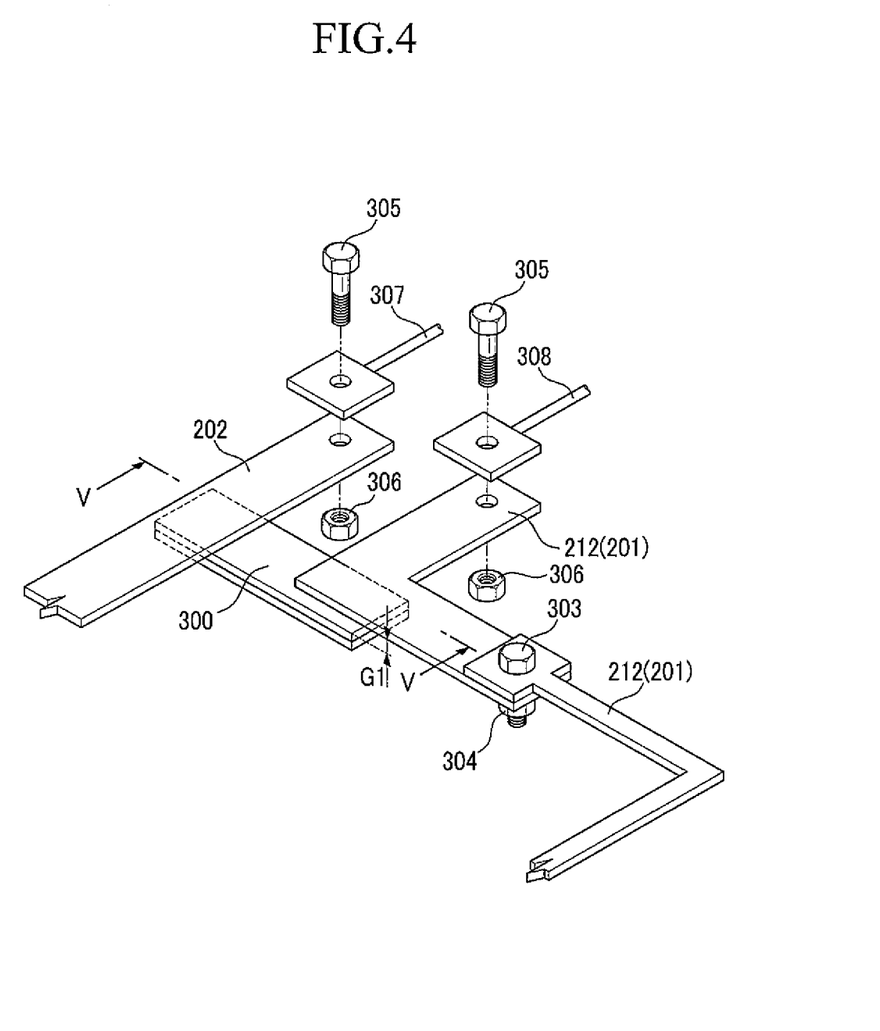
FIG. 4 is an exploded perspective view of a module terminal in FIG. 1.
Figure 5:
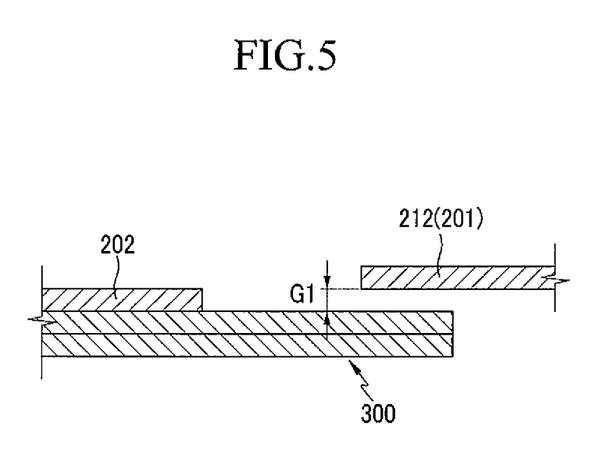
FIG. 5 is a cross-sectional view taken along the line V-V of FIG. 4.
Figure 6:
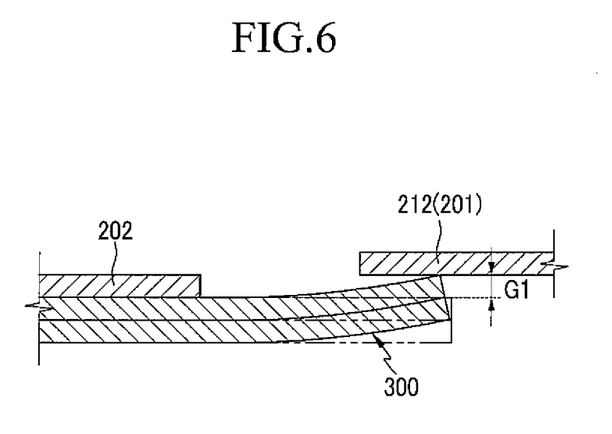
FIG. 6 is an operation state diagram of the module terminal illustrated in FIG. 4.

FIG. 4 is an exploded perspective view of a module terminal illustrated in FIG. 1, FIG. 5 is a cross-sectional view taken along the line V-V of FIG. 4, and FIG. 6 is an operation state diagram of the module terminal illustrated in FIG. 4. Referring to FIG. 4 to FIG. 6, draw-out cables 307 and 308 are respectively coupled to the terminal extension 212 of the first module terminal 201 and the second module terminal 202 with a bolt 305 and a nut 306.

One end of the module short-circuit member 300 is coupled to the second module terminal 202 including the second final terminal, and the terminal extension 212 of the first module terminal 201 and the other end of the module short-circuit member 300 are separated by the first gap G1.

The first gap G1 is in a range (e.g., a predetermined range) such that the module short-circuit member 300 may be bent or transformed by the heat (e.g., the inner heat) of the unit cell 100 transmitted to the second module terminal 202 while the unit cell 100 operates at the lower current range at which the cell fuses 511 and 521 of the unit cells 100 may not operate, such that the module short-circuit member 300 may contact (e.g., may be shorted to or coupled to) the terminal extension 212 of the first module terminal 201.

In the first example embodiment, the module short-circuit member 300 is separated from a lower side of the terminal extension 212 by the first gap G1 and configured to bend (e.g., is bent) toward the lower side of the terminal extension 212 according to the temperature of the second module terminal 202. However, the module short-circuit member 300 may be separated from an upper side of the terminal extension 212 by the first gap G1 and may be configured to bend (e.g., bent) toward the upper side of the terminal extension 212 according to the temperature of the second module terminal 202.

While operating at the lower current region at which the cell fuses 511 and 521 (referring to FIG. 3) of the unit cell 100 may not operate, the heat generated in (e.g., the heat generated inside) the unit cell 100 is transmitted to the module short-circuit member 300 positioned outside of the unit cell 100 through the second module terminal 202.

Due to the transmitted heat (e.g., the external transmitted heat), the module short-circuit member 300 bends toward the lower side of the terminal extension 212 and the module short-circuit member 300 may traverse the first gap G1 and contact the terminal extension 212 such that the first gap G1 is eliminated. Accordingly, the rechargeable battery module 1 creates (e.g., realizes) the external short-circuit while operating at the lower current region, and the high current may flow through the unit cells 100 due to the external short-circuit.

Accordingly, the current may be discharged in the rechargeable battery module 1, and in the unit cells 100, the plurality of cell fuses 511 and 521 may operate (e.g., operate to be disconnected), and the operation of the rechargeable battery module 1 may be terminated.

Hereafter, various example embodiments will be described. The description of the same elements as in the first example embodiment and the described example embodiment may be omitted when describing subsequent example embodiments, and differences may be described.

Figure 7:
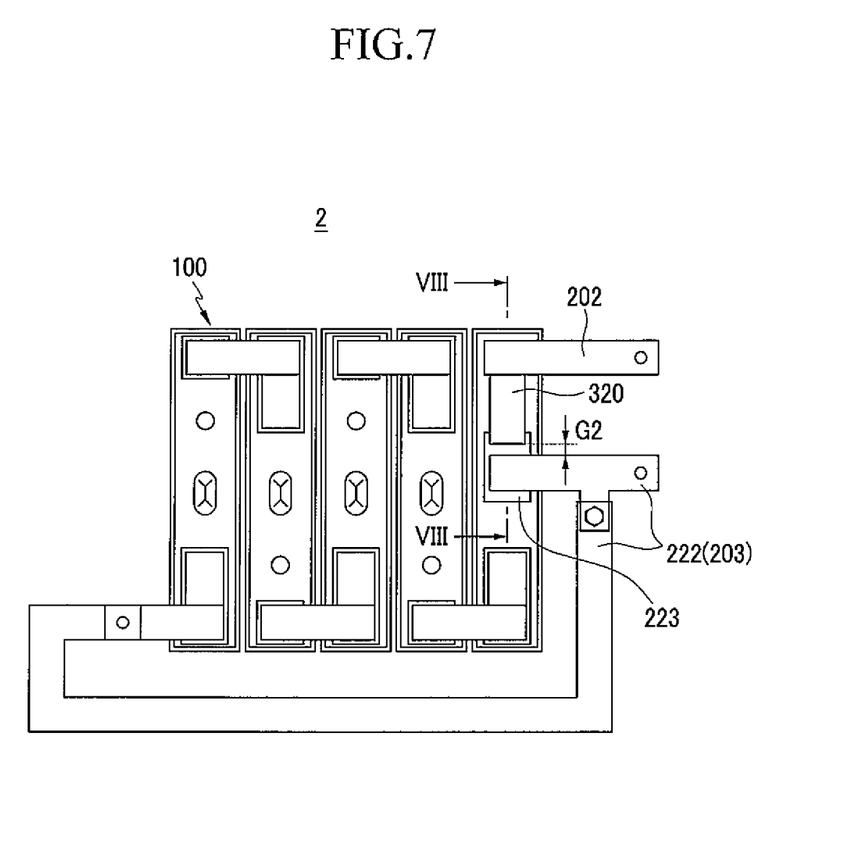
FIG. 7 is a top plan view of a rechargeable battery module according to a second example embodiment.
Figure 8:
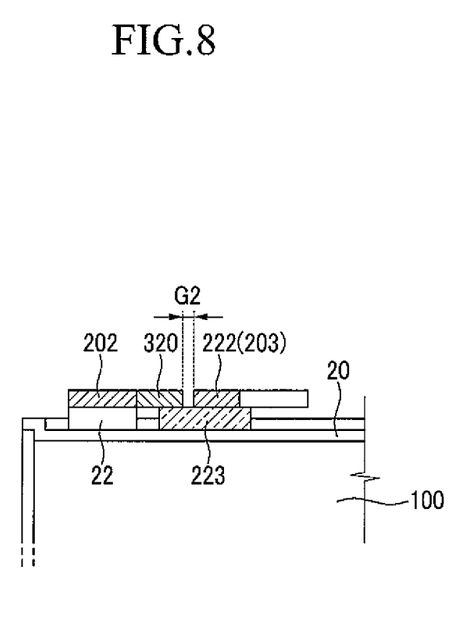
FIG. 8 is a cross-sectional view taken along the line VIII-VIII of FIG. 7.

FIG. 7 is a top plan view of a rechargeable battery module according to a second example embodiment, and FIG. 8 is a cross-sectional view taken along the line VIII-VIII of FIG. 7.

Referring to FIG. 7 and FIG. 8, in the rechargeable battery module 2 of the second example embodiment, a module short-circuit member 320 is coupled to the second module terminal 202 and is separated from (e.g., adjacent) a side of a terminal extension 222 of a first module terminal 203 by a second gap G2, and is configured to expand according to the temperature of the second module terminal 202.

In the second example embodiment, the module short-circuit member 320 is configured to expand (e.g., expanded) toward the side of the terminal extension 222, compared with the first example embodiment in which the module short-circuit member 300 is configured to bend (e.g., bent) in a vertical direction.

For example, the module short-circuit member 320 may include a shape memory material, be coupled to the second module terminal 202, and be separated from the terminal extension 222 of the first module terminal 203 by the second gap G2.

In this case, the module short-circuit member 320 is disposed on the cap plate 20 of the unit cell 100 with an insulating member 223 interposed therebetween. That is, the module short-circuit member 320 and the terminal extension 222 are disposed on the insulating member 223 and separated by the second gap G2.

While operating at the lower current region at which the cell fuses 511 and 521 (referring to FIG. 3) of the unit cell 100 may not operate, the heat generated in the unit cell 100 may be transmitted to the module short-circuit member 320 through the second module terminal 202.

Due to the transmitted heat (e.g., the external transmitted heat), the module short-circuit member 320 expands and thereby traverses the second gap G2 and contacts the terminal extension 222 such that the second gap G2 is eliminated.

Accordingly, the rechargeable battery module 2 creates (e.g., realizes) the external short-circuit while operating at the lower current region and the high current flows through the unit cells 100 due to the external short-circuit.

Accordingly, in the rechargeable battery module 2, the current is discharged, and in the unit cells 100, the plurality of cell fuses 511 and 521 may operate (e.g., operate to be disconnected), and the operation of the rechargeable battery module 2 is terminated.

Figure 9:
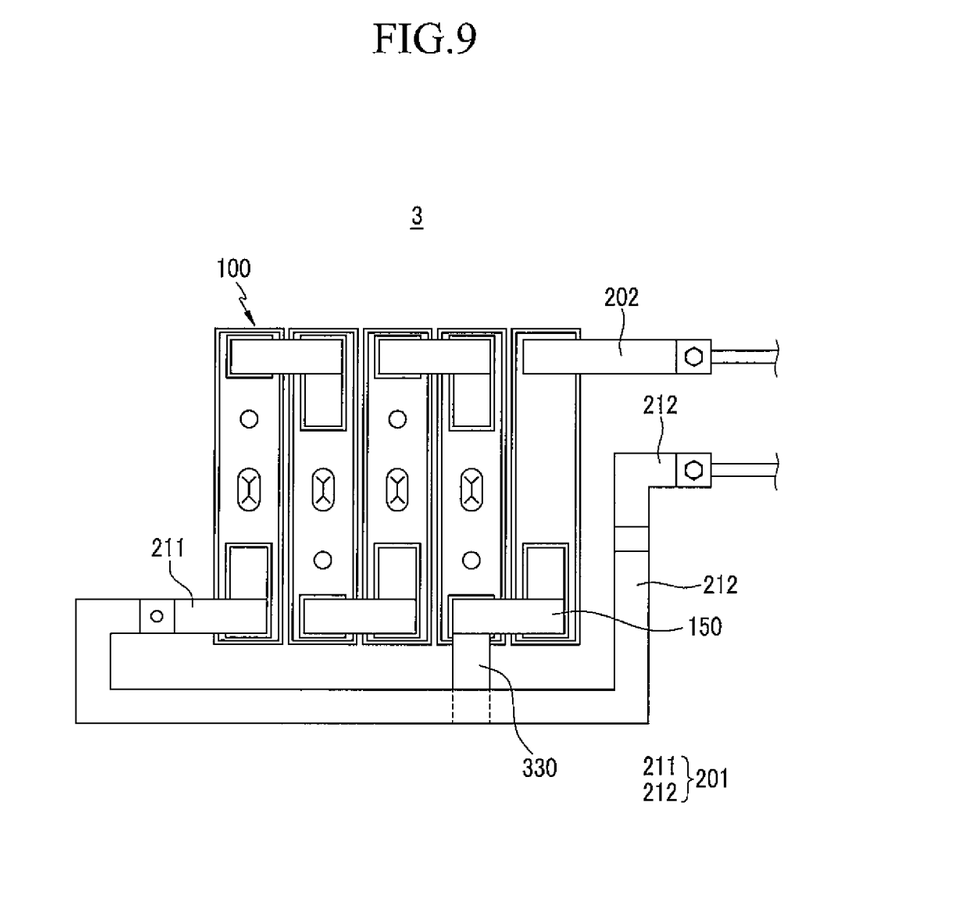
FIG. 9 is a top plan view of a rechargeable battery module according to a third example embodiment.
Figure 10:
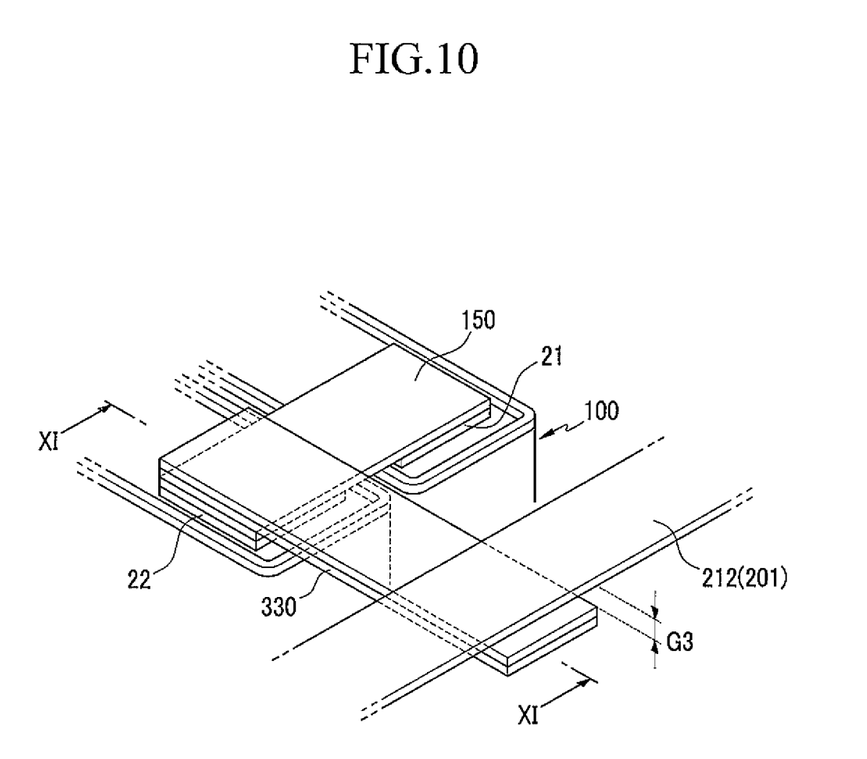
FIG. 10 is a partial perspective view of FIG. 9.
Figure 11:
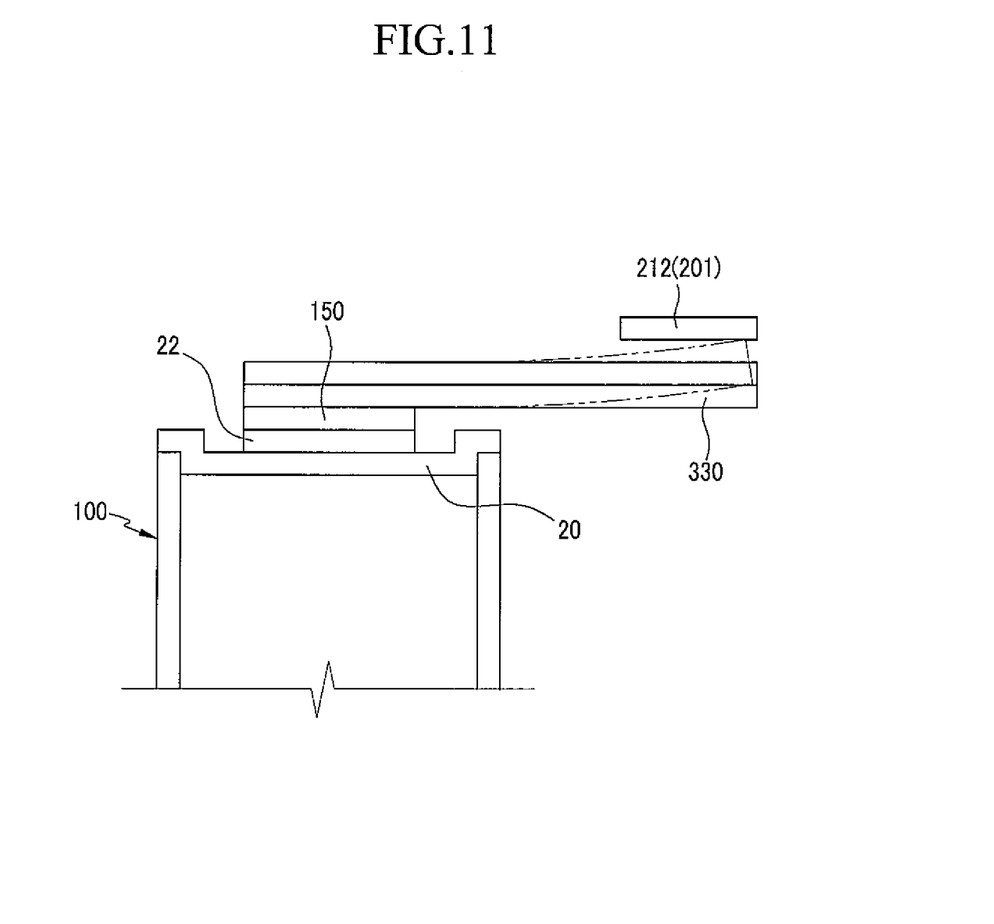
FIG. 11 is a cross-sectional view taken along the line XI-XI of FIG. 10.

FIG. 9 is a top plan view of a rechargeable battery module according to a third example embodiment, FIG. 10 is a partial perspective view of FIG. 9, and FIG. 11 is a cross-sectional view taken along the line XI-XI of FIG. 10.

Referring to FIG. 9 to FIG. 11, in the rechargeable battery module 3 according to the third example embodiment, a module short-circuit member 330 is coupled to at least one of the second electrode terminals 22 of the unit cells 100 and is separated from a lower side of a terminal extension 212 by a third gap G3 and configured to bend (e.g., being bent) toward the lower side of the terminal extension 212 according to the temperature of the second electrode terminal 22.

While operating at the lower current region at which the cell fuses 511 and 521 (referring to FIG. 3) of the unit cell 100 may not operate, the heat generated in the unit cell 100 may be transmitted to the module short-circuit member 330 through the second electrode terminal 22.

Due to the transmitted heat (e.g., the external transmitted heat), the module short-circuit member 330 bends toward the lower side of the terminal extension 212 and traverses the third gap G3 and contacts the terminal extension 212 such that the third gap G3 is terminated. Accordingly, the rechargeable battery module 3 creates (e.g., realizes) the external short-circuit, and the high current flows through the unit cells 100 due to the external short-circuit.

Accordingly, in the rechargeable battery module 3, the current is discharged, and in the unit cells 100, the plurality of cell fuses 511 and 521 may operate (e.g., operate to be disconnected), and the operation of the rechargeable battery module 3 is terminated.

While this disclosure has been described in connection with what is presently considered to be example embodiments, it is to be understood that the invention is not limited to the disclosed embodiments, but, on the contrary, is intended to cover various modifications and equivalent arrangements included within the spirit and scope of the appended claims and their equivalents.

| | |
|---|---|
| 1, 2, 3: rechargeable battery module | 10: electrode assembly |
| 11: first electrode (negative electrode) | 11a, 12a: coating part |
| 11b, 12b: uncoated region | |
| 12: second electrode (positive electrode) | |
| 13: separator | 15: case |
| 20: cap plate | |
| 21: first electrode terminal (negative terminal) | |
| 21a, 22a: rivet terminal | 21b, 22b: flange |
| 21c, 22c: plate terminal | |
| 22: second electrode terminal (positive terminal) | |
| 24: vent hole | 25: vent plate |
| 25a: notch | 27: sealing stopper |
| 29: electrolyte injection opening | 31: insulating member |
| 36, 37: negative, positive electrode gasket | |
| 40: external short-circuit part | |
| 41: short-circuit tab | 43: short-circuit member |
| 42: short-circuit hole | 46: top plate |
| 51, 52: negative, positive electrode lead tab | |
| 61, 62: negative, positive electrode insulating member | |
| 100: unit cells | |
| 101, 102: one unit cell (right, left unit cell) | |
| 150: bus bar | 201, 203: first module terminal |
| 202: second module terminal | 211: first final terminal |
| 212, 222: terminal extension | 223: insulating member |
| 300, 320, 330: module short-circuit member | 301, 303, 305: bolt |
| 302, 304, 306: nut | 307, 308: draw-out cable |
| 511, 521: cell fuse | G1, G2, G3: first, second, third gap |
| H1, H2: terminal hole | |

What is claimed is:

1. A rechargeable battery module comprising:
   a plurality of unit cells each comprising an electrode assembly, a first electrode terminal, and a second electrode terminal;
   a bus bar coupling adjacent ones of the plurality of unit cells;
   a first module terminal coupled to the first electrode terminal of one of the plurality of unit cells at one end of the unit cells;
   a second module terminal coupled to the second electrode terminal of an other one of the plurality of unit cells at an opposite end of the unit cells; and
   a module short-circuit member,
   wherein, in a first state, the module short-circuit member is electrically coupled to one of the first module terminal or the second module terminal and is separated from the other one of the first module terminal or the second module terminal, and
   wherein the module short-circuit member is configured to enter a second state from the first state according to temperature, and in the second state, the module short-circuit member contacts the other one of the first module terminal or the second module terminal.

2. The rechargeable battery module of claim 1, wherein the module short-circuit member has a bimetal structure, and
   in the first state, the module short-circuit member is coupled to the second module terminal and is separated from the first module terminal by a first gap.

3. The rechargeable battery module of claim 1, wherein the first module terminal comprises a first final terminal of the first electrode terminals of the plurality of unit cells, and
   an end of a terminal extension is coupled to the first final terminal and a portion of the terminal extension is adjacent the second module terminal.

4. The rechargeable battery module of claim 3, wherein the second module terminal comprises a second final terminal of the second electrode terminals of the plurality of unit cells, and
   in the first state, the module short-circuit member is coupled to the second final terminal, is separated from either an upper side or a lower side of the terminal extension by a first gap, and is configured to bend toward said either the upper side or the lower side of the terminal extension according to a temperature of the second final terminal.

5. The rechargeable battery module of claim 3, wherein the second module terminal comprises a second final terminal of the second electrode terminals of the plurality of unit cells, and
   in the first state, the module short-circuit member is coupled to the second final terminal, is separated from an other end of the terminal extension by a second gap, and is configured to expand toward the other end of the terminal extension according to a temperature of the second final terminal.

6. The rechargeable battery module of claim 5, wherein the module short-circuit member comprises a shape memory alloy.

7. The rechargeable battery module of claim 3, wherein, in the first state, the module short-circuit member is coupled to at least one second electrode terminal of the plurality of unit cells, is separated from either an upper side or a lower side of the terminal extension by a third gap, and is configured to bend toward said either the upper side or the lower side of the terminal extension according to a temperature of the second electrode terminal.

8. The rechargeable battery module of claim 1, wherein the plurality of unit cells are arranged along a first direction,
    the one of the plurality of unit cells is at the one end of the unit cells along the first direction, and
    the other one of the plurality of unit cells is at the opposite end of the unit cells in the first direction.

9. The rechargeable battery module of claim 8, wherein the plurality of unit cells comprises at least three unit cells.

10. The rechargeable battery module of claim 3, wherein the terminal extension extends beyond a periphery of the unit cells.

11. The rechargeable battery module of claim 3, wherein, in the first state, the end of the terminal extension is electrically coupled to the first final terminal.

* * * * *